United States Patent [19]

Kusakabe et al.

[11] Patent Number: 4,567,507
[45] Date of Patent: Jan. 28, 1986

[54] COLOR TELEVISION SIGNAL CONVERSION DEVICE

[75] Inventors: Tetsuo Kusakabe; Tetsuro Sakai; Kazuhiko Honda, all of Fukaya, Japan

[73] Assignee: Tokyo Shibaura Denki Kabushiki Kaisha, Kawasaki, Japan

[21] Appl. No.: 476,403

[22] Filed: Mar. 17, 1983

[30] Foreign Application Priority Data

Mar. 19, 1982 [JP] Japan .................................. 57-42693

[51] Int. Cl.[4] .............................................. H04M 9/42
[52] U.S. Cl. ..................................... 358/11; 358/330; 358/310
[58] Field of Search .................... 358/11, 21, 30, 310, 358/330

[56] References Cited

U.S. PATENT DOCUMENTS

| | | | |
|---|---|---|---|
| 3,702,377 | 11/1972 | Kerr et al. | 358/11 |
| 3,872,498 | 3/1975 | Pritchard | 358/21 |
| 3,917,415 | 11/1975 | Eguchi | 358/11 |
| 4,283,738 | 8/1981 | Rutishauser | 358/11 |

FOREIGN PATENT DOCUMENTS

| | | | |
|---|---|---|---|
| 1193986 | 6/1965 | Fed. Rep. of Germany . | |
| 2319768 | 1/1977 | Fed. Rep. of Germany . | |
| 43-14286 | 6/1968 | Japan . | |
| 0054325 | 5/1977 | Japan | 358/11 |
| 2066617 | 7/1981 | United Kingdom . | |

Primary Examiner—Aristotelis M. Psitos
Attorney, Agent, or Firm—Cushman, Darby and Cushman

[57] ABSTRACT

Color TV signal data picked up from an NTSC video disc is separated by a separation filter into a first chrominance signal (1.52 MHz) and a luminance signal. In this case, the rotational frequency of the video disc is set such that a horizontal line frequency of the luminance signal is 15.625 kHz, which is the line frequency of a PAL signal component. The first chrominance signal (1.52 MHz) is converted by a frequency converter to a second chrominance signal (4.43 MHz). The second chrominance signal (4.43 MHz) is supplied to the first input terminal of a switch through a 45° phase shifter and directly to the second input terminal of the switch. The switch alternately selects the first and second input terminals thereof in response to a burst gate pulse, whereas the switch selects only the second input terminal during any period other than the burst period. A third chrominance signal is then produced at an output terminal of the switch. The third chrominance signal is supplied to a modulator. A carrier signal having a frequency (8.86 MHz) twice that (4.43 MHz) of a subcarrier is supplied to the modulator for every other line so as to perform the R-Y axis processing. Therefore, a PAL chrominance signal appears at an output terminal of the modulator.

9 Claims, 18 Drawing Figures

PRIOR ART F I G. 1
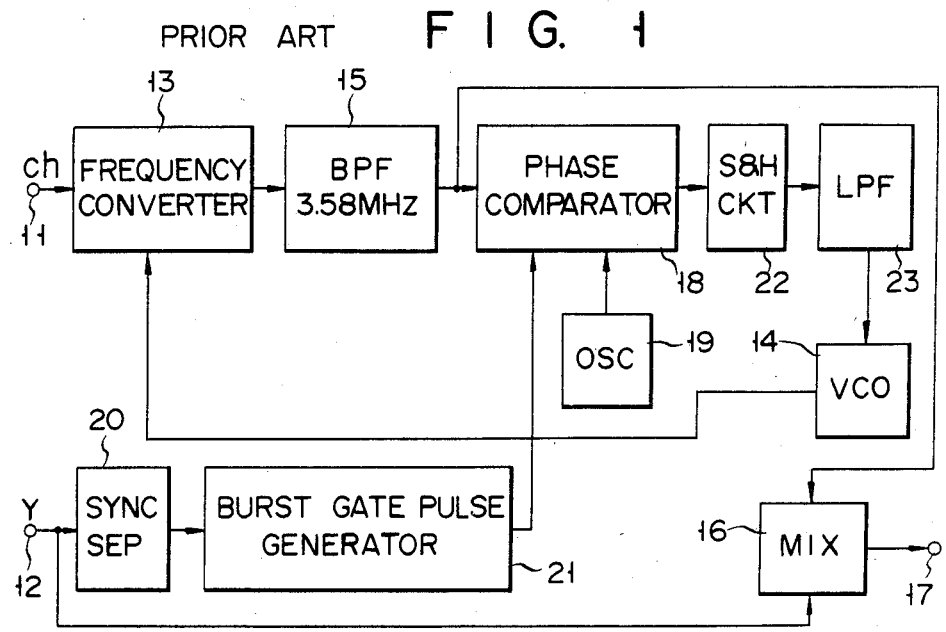
PRIOR ART F I G. 2
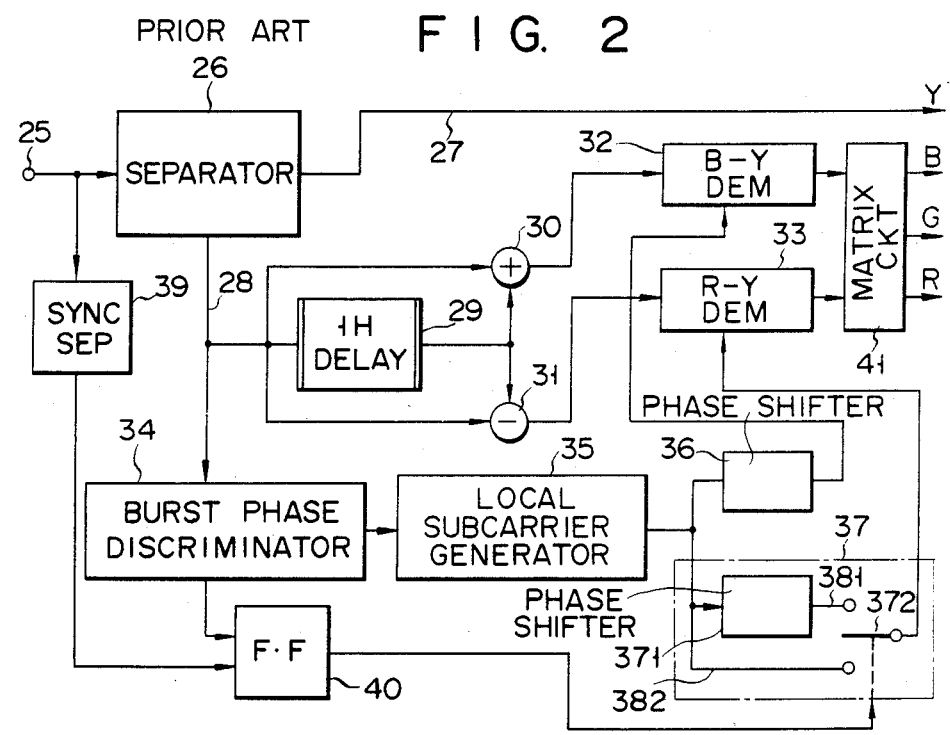

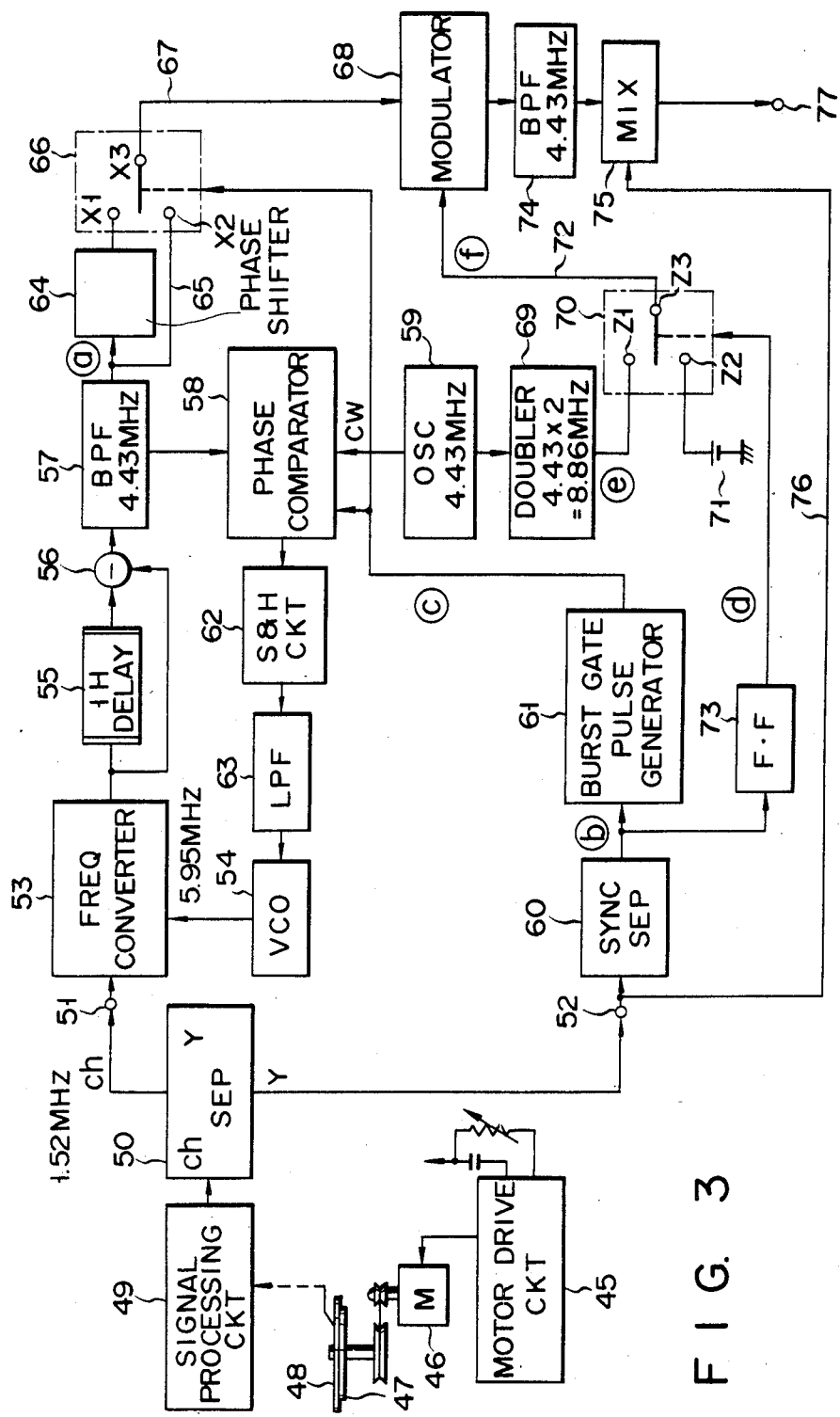
F I G. 3

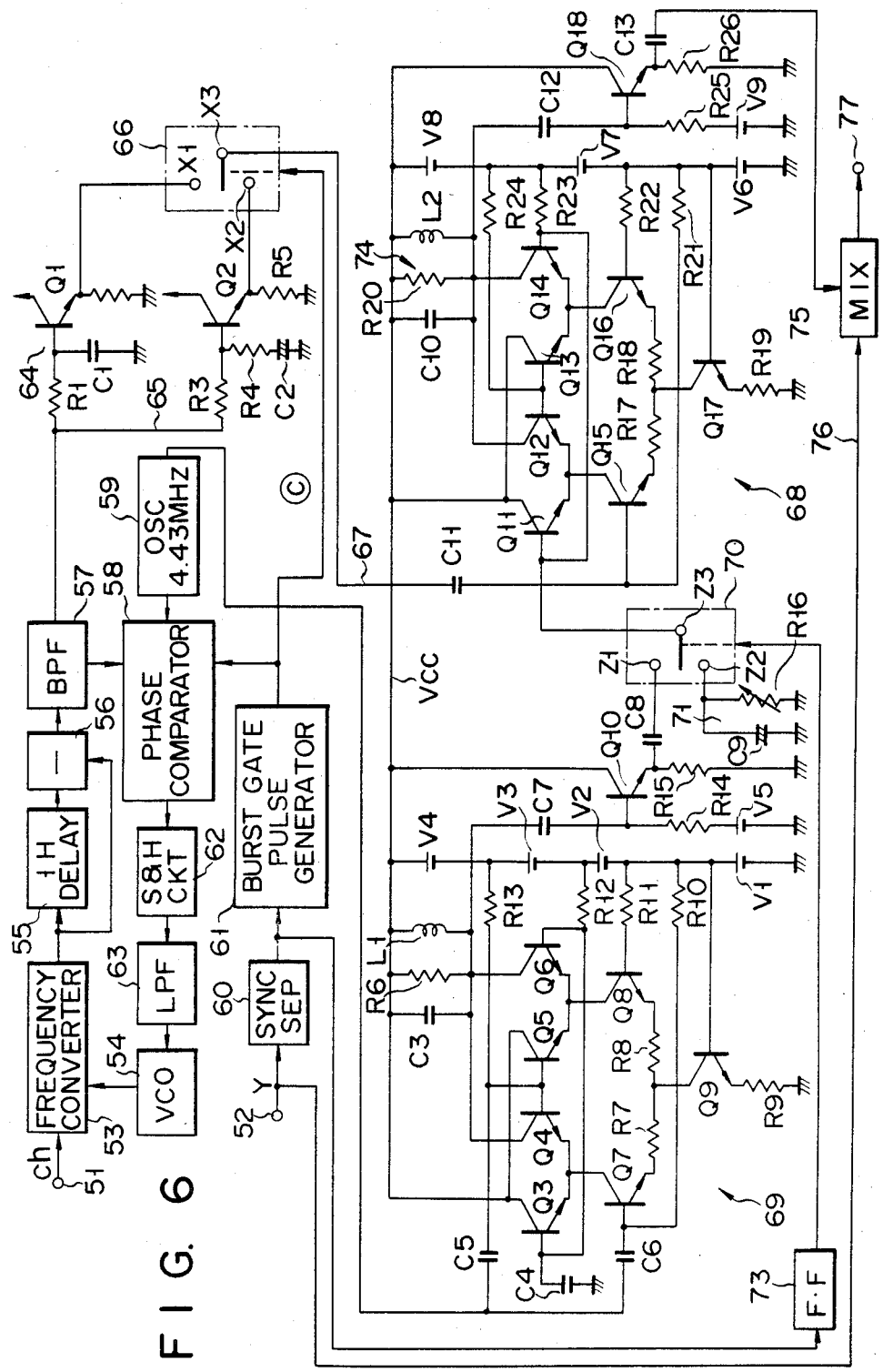
F I G. 6

COLOR TELEVISION SIGNAL CONVERSION DEVICE

This application is related to co-pending U.S. application Ser. No. 476,402, entitled "COLOR TELEVISION SIGNAL CONVERTING CIRCUIT", and filed on Mar. 17, 1983, and to co-pending U.S. application Ser. No. 476,401, entitled "SIGNAL CONVERTER CIRCUIT FOR COLOR TV", and filed on Mar. 17, 1983.

BACKGROUND OF THE INVENTION

I. Field of the Invention

The present invention relates to a color TV signal conversion device used for converting an NTSC color TV signal to a PAL color TV signal in a video disc reproduction system or a video tape recorder.

The NTSC color television signal includes a luminance signal and a carrier chrominance signal. The carrier chrominance signal has two color difference signal components R-Y and B-Y which modulate a color subcarrier in accordance with quadrature modulation. In the case of recording the color TV signal on a recording medium such as a video disc, the carrier chrominance signal is frequency-converted to a low frequency and is recorded on the recording medium. Therefore, when a pickup signal from the video disc is reproduced, the low-frequency carrier chrominance signal is demodulated to an original frequency carrier chrominance signal.

FIG. 1 shows a video disc reproduction system for reproducing the signals recorded by the NTSC system.

A color TV signal to be detected and reproduced from the video disc is separated into a low-frequency carrier chrominance signal Ch, and a luminance signal (Y signal) which includes a synchronizing signal. The signal Ch and the Y signal are supplied to input terminals 11 and 12, respectively.

The carrier frequency of the carrier chrominance signal Ch applied to the input terminal 11 is interleaved with that of the Y signal, for example, in the following manner:

$$195/2 \cdot fH = 1.534091 \text{ (MHz)}$$

where fH is the line frequency.

In order to reconvert the 1.53-MHz chrominance signal (low-frequency converted chrominance signal) to the 3.58-MHz chrominance signal (original frequency carrier chrominance signal), the 1.53-MHz chrominance signal is supplied to a frequency converter 13. The frequency converter 13 multiplies the 1.53-MHz chrominance signal and a carrier wave (CW) signal (5.11 MHz = 1.53 MHz + 3.58 MHz). The 5.11-MHz carrier wave signal is produced by a VCO (voltage controlled oscillator) 14. The multiplied signal is supplied to a band-pass filter 15 having a 3.58 MHz bandpass characteristic. The NTSC 3.58-MHz chrominance signal is then obtained from the band-pass filter 15.

This 3.58-MHz chrominance signal is mixed by a mixer 16 with the Y signal applied to the input terminal 12. An NTSC color TV signal then appears at an output terminal 17.

A video disc player is subject to a time base error of signal components which is caused by wow and flutter of a turntable or the like. Such a time base error causes significant jitter in the 1.53-MHz chrominance signal. A video disc player generally has an automatic phase control (APC) loop in order to eliminate such a problem. More specifically, the chrominance signal reconverted to a frequency of 3.58 MHz is supplied to a phase comparator 18 which compares the phase of this input signal with that of a reference signal having a frequency of 3.58 MHz during each burst period. The 3.58-MHz reference signal is produced by a 3.58-MHz oscillator 19. A burst gate pulse is obtained from a burst gate pulse generator 21, which receives an output signal from a sync separator 20 which separates a horizontal synchronizing signal from the Y signal supplied to the input terminal 12, and which then supplies an output signal to the phase comparator 18. An output signal from the phase comparator 18 is held for a 1-H period by a sample and hold circuit 22, and is supplied to an oscillation frequency control end of the VCO 14 through a low-pass filter 23.

A PAL color TV system has, in addition to the luminance signal, two chrominance signal components (color difference signals) according to which the subcarrier is quadrature-modulated. One (R-Y signal) of the two chrominance signal components is inverted for each successive line. A carrier frequency fsc of the PAL system is generally selected to be 4.43 MHz.

FIG. 2 shows an example of a demodulation circuit for demodulating such a PAL color TV signal. Referring to FIG. 2, a PAL composite signal is supplied to an input terminal 25 and is then supplied to a C-Y separator 26 which produces a Y signal onto a line 27 and a carrier chrominance signal onto a line 28. The carrier chrominance signal is subjected to addition by an adder 30 and subtraction by a subtractor 31 of a delayed carrier chrominance signal from a 1-H delay line 29. A B-Y signal appears at the output end of the adder 30, while an R-Y signal appears at the output end of the subtractor 31. These B-Y and R-Y signals are respectively supplied to B-Y and R-Y demodulators 32 and 33. The line 28 is also connected to a local subcarrier oscillator 35 through a burst phase discriminator 34. A reference subcarrier signal of 4.43 MHz is supplied to the B-Y demodulator 32 through a 90° phase shifter 36 and is also supplied to the R-Y demodulator 33 through a line changeover switch 37. Since the R-Y signal changes its polarity for each successive line, the reference subcarrier signal to be supplied to the R-Y demodulator 33 must be inverted by 180° for each successive line. Thus, the line changeover switch 37 has a 180° phase shifter 371 and a changeover switch 372. The changeover switch 372 is switched between a 180° phase shift line 381 and a direct coupling line 382 for each line.

In order to control the switching operation of the switch 372, a sync signal is separated from the PAL composite signal at the input terminal 25 through a sync separator 39. The sync signal is then supplied to a flip-flop 40 which produces a signal which is used as a line changeover signal.

The signals sync-detected by the B-Y and R-Y demodulators 32 and 33 are supplied to a matrix circuit 41 which produces blue, green and red signals B, G and R, respectively.

When the signal recorded by the NTSC system on the video disc is reproduced by an NTSC reproduction system, the reproduced color TV signal is of the NTSC system. Therefore, even if the NTSC reproduced color TV signal is supplied to a color TV receiver of the PAL system, color reproduction images cannot be obtained.

When the NTSC reproduced color TV signal is supplied to a PAL color TV receiver, a marginaly satisfactory reproduced image can be obtained wherein the luminance signal seems unnaturally bright because of different standards. However, as far as the chrominance signal is concerned, since different signal processing systems are adopted in the NTSC and PAL systems, a good reproduced color image cannot be obtained.

In European countries where the PAL system is adopted, the need arises to reproduce the NTSC color TV signal with a PAL color TV receiver. In order to respond to such a demand, in the present satellite relay system, the NTSC color TV signal is completely demodulated by the NTSC system and the demodulated signal is then converted to a PAL color TV signal.

However, it is impossible in practice to apply the techniques used in the satellite relay system to a video disc player whose circuit scale, cost and size are limited.

SUMMARY OF THE INVENTION

It is an object of the present invention to provide a simple color TV signal conversion device which converts a pickup signal recorded by the NTSC or PAL system on a video disc to a color TV signal of the opposite (PAL or NTSC) system.

It is another object of the present invention to provide a color TV signal conversion device wherein an output color TV signal from a video disc player for reproducing an NTSC or PAL signal from a video disc can be demodulated by a PAL or NTSC color TV receiver, thereby obtaining a reproduced color image.

In order to achieve the above objects of the present invention, there is provided a color TV signal conversion device, comprising: signal generating means for generating color TV signal data which includes a luminance signal and a first chrominance signal which is frequency-converted to a low-frequency signal; separating filter means for receiving the color TV signal data and for separating the color TV signal data into the first chrominance signal and the luminance signal; frequency converting means for converting the first chrominance signal to a second chrominance signal of a high frequency and for producing the second chrominance signal at an output terminal thereof, said frequency converting means having one input terminal which receives the first chrominance signal from said separating filter means and the other input terminal which receives a first carrier signal from a first carrier signal generating means; first band-pass filter means for receiving an output from said frequency converting means and for producing the second chrominance signal at an output terminal thereof; first switching means for shifting by a predetermined phase a burst signal included in the second chrominance signal from said first band-pass filter means in every other horizontal period and for producing a third chrominance signal including a phase-shifted burst signal at an output terminal thereof, said first switching means having a first input terminal which receives the second chrominance signal from said first band-pass filter means through a predetermined-degree phase shifter and a second input terminal which receives the second chrominance signal directly from said first band-pass filter means; first switch controlling means for alternately selecting said first and second input terminals of said first switching means in every burst signal period, and for selecting said second input terminal during a period except for the burst signal period such that a horizontal sync signal separated from the luminance signal is delayed and shaped to obtain a burst gate pulse which is applied to a control terminal of said first switching means; second carrier signal generating means for generating a second carrier signal having a frequency twice the frequency of the first carrier signal from said first carrier signal generating means; second switching means for alternately producing the second carrier signal and a DC bias signal at an output terminal thereof for every other horizontal line, said second switching means having a first input terminal which receives the second carrier signal from said second carrier signal generating means and a second input terminal which receives the DC bias signal; second switch controlling means for frequency-dividing by ½ the horizontal sync signal separated from the luminance signal to produce a frequency-divided output at a control terminal of said second switching means so as to allow said second switching means to alternately select said first and second input terminals thereof for every other horizontal line to produce an R-Y axis converted carrier signal at said output terminal of said second switching means; modulating means for processing an R-Y signal component of the third chrominance signal from said first switching means, said modulating means having one input terminal which receives the third chrominance signal from said first switching means and the other input terminal which receives the R-Y axis converted carrier signal from said second switching means; and second band-pass filter means, connected to an output terminal of said modulating means, for extracting a carrier chrominance signal which has a predetermined bandwidth.

BRIEF DESCRIPTION OF THE DRAWINGS

FIG. 1 is a block diagram of a conventional NTSC color TV signal conversion system;

FIG. 2 is a block diagram of a conventional PAL color TV signal conversion system;

FIG. 3 is a block diagram of a color TV signal conversion device according to an embodiment of the present invention;

FIG. 6 is a circuit diagram showing part of the device shown in FIG. 3;

DETAILED DESCRIPTION OF THE PREFERRED EMBODIMENTS

The signal components of an NTSC color TV signal, the signal components of the signal recorded by the NTSC system on a video disc, and the signal components of a PAL color TV signal are described hereinafter.

A line frequency fH of the NTSC color TV signal is 15.734 kHz. The number of scanning lines is 525. A field frequency fv is 59.93 Hz. A horizontal period (1H) is 63.36 μsec.

A subcarrier frequency fD of the low-frequency converted chrominance signal is 1.53409 MHz (½×fH×195).

On the other hand, a line frequency fH of the PAL color TV signal is 15.625 kHz. A field frequency fv is 50 Hz. The number of scanning lines is 625. A horizontal period (1H) is 64 μsec.

In order to convert the NTSC horizontal period (63.56 μsec) to the PAL horizontal period (64 μsec), the rotational frequency of the video disc in accordance with the NTSC system must be multiplied by 0.9931 (63.56/64) times the normal frequency. In other words, in order to display the NTSC signal reproduced from the video disc on a screen of a PAL color TV receiver, the rotational frequency of the turntable of the video disc player must be decreased to 0.9931 times the normal frequency. Therefore, the line frequency fH (=15.734 kHz) of the NTSC color TV signal can be converted to the line frequency fH (=15.625 kHz) of the PAL color TV signal. This can be achieved by changing an oscillation frequency of the reference oscillator in a circuit for controlling the rotation frequency of the turntable motor in the video disc player. As a result, any frequency (line frequency, chrominance signal frequency) other than the field frequency fv can be converted between the NTSC and PAL systems.

The frequencies of the signals of the NTSC video disc and the frequencies of the signals converted by the 0.9931 multiplication so as to correspond to those in the PAL system are shown in Table 1 below.

TABLE 1

|  | NTSC | PAL |
| --- | --- | --- |
| Line frequency fH | 15.734 kHz | 15.625 kHz |
| Scanning lines | 525 | 525 |
| Field frequency fV (=2/525.fH) | 59.93 Hz | 59.52 Hz |
| Subcarrier frequency fD (low-frequency conversion) | 1.53409 MHz | 1.52343 MHz |

The above description is made assuming that the rotational frequency of the disc as a signal generating means is decreased to 0.9931 times the normal frequency.

Figure 4:
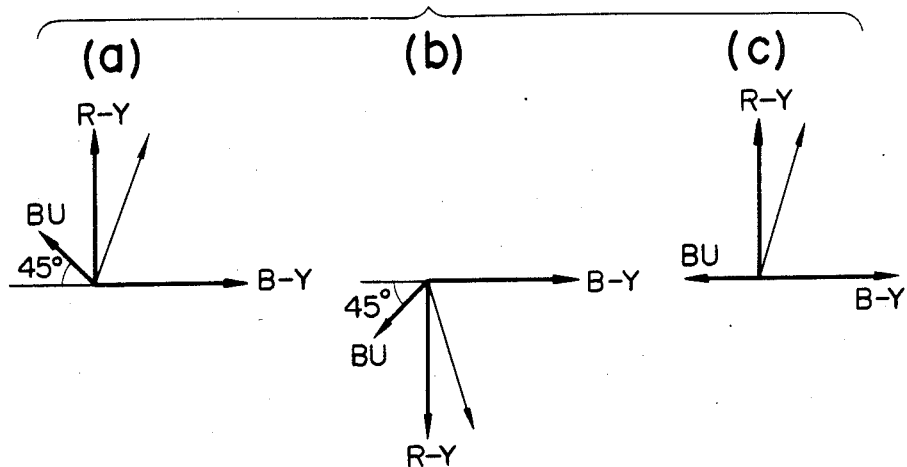
FIGS. 4(a) and 4(b) are diagrams showing the vectors of a PAL color TV signal.
FIG. 4(c) is a diagram showing vectors of an NTSC color TV signal.

The difference between the chrominance signals of the PAL and NTSC systems will be briefly described with reference to FIG. 4. The PAL and NTSC systems are the same in that the two color difference signals B-Y and R-Y are simultaneously transmitted. However, in the PAL system, the phase of the R-Y signal in every successive line is inverted. The R-Y and B-Y signals then modulate the subcarrier in accordance with quadrature modulation. Therefore, according to the vector diagram of the PAL signal, the R-Y signal of the PAL system has a phase in a given line as shown in FIG. 4(a), and it has an inverted phase in the next line as shown in FIG. 4(b). A burst signal BU of the PAL system is shifted by 45° with respect to the B-Y axis.

However, in the NTSC system, the B-Y and R-Y signals quadrature-modulate the subcarrier, as shown in FIG. 4(c). The signals can be expressed by vectors which have the same sign. In this case, a burst signal is shifted by 180° with respect to the B-Y signal.

In order for a PAL receiver to demodulate the signal recorded by an NTSC system on the video disc, the following conditions must be satisfied:

(1) A low-frequency converted chrominance signal (1.52 MHz) must be converted to a 4.43-MHz PAL chrominace signal.

(2) The phase of the R-Y signal must be inverted for each successive line.

(3) The phase of the burst signal must be shifted by 45° for every other line.

The device shown in FIG. 3 achieves the above signal conversion.

Referring to FIG. 3, a motor drive circuit 45 controls and drives a turntable motor 46. A signal picked up from a video disc 48 on a turntable 47 is supplied to a separation filter 50 through a signal processing circuit 49. The separation filter 50 separates the TV signal into a first chrominace signal Ch and a luminance signal (Y signal). The chrominance signal Ch and the Y signal are applied to input terminals 51 and 52, respectively.

The carrier frequency of the first chrominance signal Ch applied to the input terminal 51 is 1.52 MHz. This 1.52-MHz chrominance signal Ch is supplied to a frequency converter 53 which then converts the signal Ch to a 4.43-MHz signal. The frequency converter 53 also receives a first carrier wave (CW) signal (5.95 (MHz)=1.52+4.43) from a voltage controlled oscillator (VCO) 54. The frequency converter 53 multiplies the first chrominance signal (1.52 MHz) and the 5.95-MHz CW signal from a first carrier signal generating means (VCO 54), and produces a second chrominance signal (4.43 MHz). The output from the frequency converter 53 is supplied to a subtractor 56 through a 1H delay line 55. This 1H-delayed signal is subtracted from the signal supplied directly from the frequency converter 53, thereby completely eliminating the luminance component. The output from the subtractor 56 is supplied to a 4.43-MHz band-pass filter 57. The video disc play is subject to a time base error of signal components which is caused by wow and flutter of a turntable or the like. Such a time base error causes significant jitter in the 1.53 MHz carrier wave. The video disc player generally has an automatic phase control (APC) loop in order to eliminate such a problem. The output from the band-pass filter 57 is supplied to a phase comparator 58 and is compared by the phase comparator 58 with a 4.43-MHz CW signal during the burst period. It is noted that the 4.43-MHz CW signal is supplied from a 4.43-MHz oscillator 59. A burst gate pulse is obtained from a burst gate pulse generator 61, which receives an output signal from a sync separator 60 which separates a sync signal from the Y signal supplied to the input terminal 52, and which then supplies an output signal to the phase comparator 58. An output signal from the phase comparator 58 is held for a 1H period by a sample and hold circuit 62, and is supplied to a low-pass filter 63. An output signal from the low-pass filter 63 is supplied to a control terminal of the VCO 54, thereby controlling the oscillation frequency of the VCO 54.

The output signal from the band-pass filter 57 is supplied to a switch 66 through a 45° phase shifter 64, and a direct coupling line 65. The switch 66 has a stationary contact X1 connected to the 45° phase shifter 64, a stationary contact X2 connected to the direct line 65, and a movable contact X3 connected to an output line 67. The contact X3 is selectively switched to the contacts X1 and X2. The switching operation is performed by an output Ⓒ from the burst gate pulse generator 61. The switch 66 permits a 45° phase-shift and delays only the burst signal BU among the signals shown in FIG. 4(c). An output signal (i.e., a third chrominance signal) from the switch 66 is supplied to a modulator 68 through a line 67.

An output signal from the 4.43-MHz oscillator 59 is supplied to a doubler 69. An 8.86-MHz continuous wave signal (CW signal) as the output signal from the doubler 69 is supplied to a line changeover switch 70. The line changeover switch 70 has a stationary contact Z1 connected to the doubler 69, a stationary contact Z2 connected to a bias source 71, and a movable contact Z3 connected to an output line 72. As will be described later, modulator 60 is a double balanced modulator. Those having ordinary skill in the art will recognize that when the CW signal from doubler 69 is not applied to modulator 68, the double balanced modulator 68 requires a DC bias voltage. This DC bias is supplied by DC source 71 through switch 70. The contact Z3 is selectively connected to the contacts Z1 and Z2 of the switch 70. The switching operation is performed for each successive line. A signal ⓓ for controlling the above switching operation is supplied from an oscillator 73 connected to the sync separator 60. The control signal ⓓ is synchronous with the horizontal sync signal and has a frequency half of the line frequency fH.

The oscillator 73 may comprise a flip-flop which is driven by the horizontal sync signal. An output signal from the line changeover switch 70 is supplied to the modulator 68 through the line 72. The modulator 68 inverts the phase of the R-Y component of the NTSC chrominance signal components for every other line.

An output signal from the modulator 68 is supplied to a C-Y mixer 75 through a band-pass filter 74 of 4.43-MHz. The mixer 75 also receives, through a line 76, the Y signal applied to the input terminal 52. The color TV signal from an output terminal 77 of the mixer 75 can be reproduced by a general PAL receiver.

Figure 5:
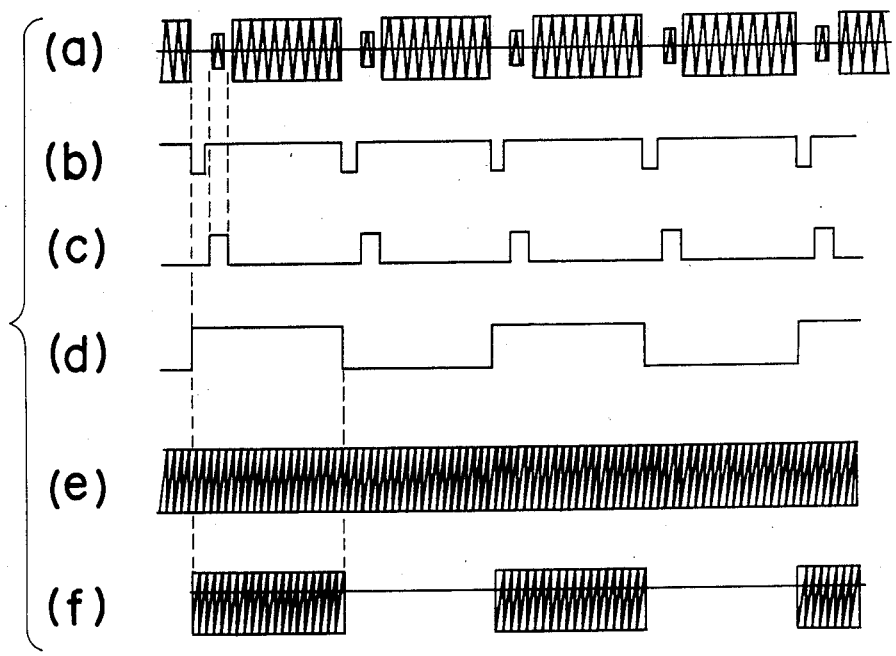
FIGS. 5(a) to 5(f) are timing charts for explaining the mode of operation of the device shown in FIG. 3.

The mode of operation of the signal switching circuit of the present invention will be described with reference to FIG. 5. FIGS. 5(a) to 5(f) show waveforms of the signals appearing in the circuit shown in FIG. 3. The signals in FIGS. 5(a) to 5(f) correspond to the signals ⓐ to ⓕ shown in FIG. 3.

FIG. 5(a) shows a chrominance signal as the output from the band-pass filter 57; FIG. 5(b) shows a horizontal sync signal as the output from the sync separator 60; FIG. 5(c) shows a burst gate pulse as the output from the burst gate pulse generator 61; FIG. 5(d) shows a line changeover signal as the output signal from the oscillator 73; FIG. 5(e) shows the 8.86-MHz CW signal as the output from the doubler 69; and FIG. 5(f) shows the signal as the output signal from the line changeover switch 70.

Both the PAL signal shown in FIGS. 4(a) and 4(b) and the NTSC signal shown in FIG. 4(c) comprise two-color difference signals which quadrature-modulate the subcarrier signal, as previously described. The NTSC chrominance signal is given by equation (1) below:

$$EN=(ER-EY)\cos(\omega sct)+(EB-EY)\sin(107\ sct) \quad \ldots (1)$$

where $\omega sc$ is the angular frequency of the subcarrier.

The PAL chrominance signals given below in equations (2) and (3) appear on each successive line:

$$EP'=(ER-EY)\cos(\omega sct)+(EB-EY)\sin(\omega sct) \quad \ldots (2)$$

$$EP=-(ER-EY)\cos(\omega sct)+(EB-EY)\sin(\omega sct) \quad \ldots (3)$$

Equation (2) is the same as equation (1). In order to convert the NTSC signal to the PAL signal compo-nents, the original signal in equation (1) is switched for every other line so as to coincide with the signal component shown in equation (3).

The burst signal of the PAL signal is shifted by 45° with respect to the B-Y axis shown in FIG. 4(a) or 4(b). Only the burst signal is extracted from the NTSC signal and is shifted by 45° and delayed before the NTSC signal is converted to the PAL signal.

The mode of operation of the color TV signal conversion device will now be described based on the above. The frequency of the chrominance signal Ch reproduced from the disc and supplied to the input terminal 51 is 1.52 MHz (1.53×0.9931) since the rotational frequency of the disc is decreased to 0.9931 times the normal frequency. The 1.52-MHz chrominance signal is multiplied by the frequency converter 53 with the 5.95-MHz CW signal from the VCO 54. The frequency converter 53 thus produces a second chrominance signal (4.43 MHz). Since the second chrominance signal is frequency-interleaved with the horizontal sync signal ($\frac{1}{4}\cdot fH$), the second chrominance signal is subtracted by the subtractor 56 from a chrominance signal which is obtained by 1H delaying the second chrominance signal by means of the 1H delay line 55, thereby completely eliminating the luminance signal component. As a result, only the chrominance signal is extracted. The output signal from the subtractor 56 is obtained as a 4.43-MHz chrominance signal through the 4.43-MHz band-pass filter 57 (FIG. 5(a)).

The phase comparator 58, the sample and hold circuit 62, and the low-pass filter 63 constitute an APC loop. The time base error of signal components which is caused by wow and flutter of the turntable or the like and which causes a significant jitter is eliminated so as to obtain a highly stable chrominance signal.

The 4.43-MHz chrominance signal from the band-pass filter 57 is supplied to the switch 66 through the 45° phase shifter 64 so as to shift the phase of the burst signal, and through the direct coupling line 65. The switch 66 is switched by the burst gate pulse (FIG. 5(c)) such that the contact X1 is connected to the contact X3 only during the burst period, and the contact X2 is connected to the contact X3 during any period except for the burst period. The switch 66 only shifts and delays the phase of the burst signal by 45°, thereby obtaining the third chrominance signal shown in FIG. 4(a).

Meanwhile, the output signal from the 4.43-MHz oscillator 59 is supplied to the doubler 69 which then produces the second carrier wave (CW) signal (8.86 MHz) (FIG. 5(e)). This second CW signal is supplied to the line changeover switch 70 and is switched for each successive line in accordance with the output (FIG. 5(d)) from the oscillator 73. In a given line, the contacts Z1 and Z3 of the switch 70 are connected to each other; but in the next line, the contacts Z2 and Z3 thereof are connected to each other. Therefore, the switch 70 produces a signal having the second CW signal component and the DC voltage component which alternately appear for every other line (FIG. 5(f)).

The modulator 68 multiplies the output signal (chrominance signal in which the phase of the burst signal is delayed by 45°) from the switch 66 and the output (signal which alternately has the 8.86-MHz signal component and the DC signal component) from the line changeover switch 70.

The above operation is expressed by equations (4) and (5) below.

The chrominance signal is multiplied by the 8.86-MHz CW signal, so that the signal component is given as follows:

$$EP = \{(ER - EY)\cos(\omega sct) + (EB - EY)\sin(\omega sct)\} \times \{-\cos(2\ sct)\} \quad (4)$$
$$= (-\tfrac{1}{2})(ER - EY)\{\cos(3\omega sct) + \cos(-\omega sct)\} -$$
$$(\tfrac{1}{2})(EB - EY)\}\sin(3\omega sct) + \sin(-\omega sct)\}$$
$$= (\tfrac{1}{2})[-(ER - EY)\{\cos(3\omega sct) + \cos(\omega sct)\} +$$
$$(EB - EY)\{-\sin(3\omega sct) + \sin(\omega sct)\}]$$

The chrominance signal is also multiplied by the DC component, so that the signal component is given as follows:

$$EP' = \{(ER - EY)\cos(\omega sct) + (EB - EY)\sin(\omega sct)\} \times 1 \quad (5)$$
$$= (ER - EY)\cos(\omega sct) + (EB - EY)\sin(\omega sct)$$

The level adjustment is then performed by the modulator 68, and the output signal from the modulator 68 is supplied to the band-pass filter 74. Therefore, the (3 ωsc) component in equation (4) is eliminated, and the output signal from the band-pass filter 74 is given as follows:

$$EP = -(ER-EY)\cos(\omega sct) + (EB-EY)\sin(\omega sct) \quad (6)$$

According to the output from the band-pass filter 74, the signals given in equations (5) and (6) are obtained for each successive line. As a result, the chrominance signal components of the PAL system can be obtained.

The output signal from the band-pass filter 74 is mixed by the mixer 75 with the Y signal applied to the input terminal 52, thereby producing the PAL color TV signal at the output terminal 77. In this manner, the NTSC signal can be converted to the PAL signal.

FIG. 6 is a circuit diagram showing the main part of the device shown in FIG. 3. The main part comprises the 45° phase shifter 64, the modulator 68, the doubler 69 and the band-pass filter 74.

Referring to FIG. 6, the phase shifter 64 comprises a transistor Q1 and a low-pass filter of a resistor R1 and a capacitor C1. The base of the transistor Q1 is connected to the low-pass filter, the collector thereof is connected to a power source (not shown) and the emitter thereof is grounded through a resistor R2. The emitter of the transistor Q1 is also connected to the contact X1 of the switch 66. The burst signal is shifted by 45° and delayed by the low-pass filter which comprises the resistor R1 and the capacitor C1. The gain is attenuated by about 3 dB, so that the original signal is applied to the base of a transistor Q2 through an attenuator of resistors R3 and R4 so that the gain of the original signal will coincide with the gain of the signal from the low-pass filter. The emitter of the transistor Q2 is connected to the contact X2 of the switch 66.

The collector of the transistor Q2 is connected to a voltage line (not shown), and the emitter thereof is grounded through a resistor R5. The resistor R4 is grounded through a DC voltage cutoff capacitor C2.

The doubler 69 comprises a double balanced modulator. This modulator comprises transistors Q3 and Q4 which constitute a first differential amplifier, transistors Q5 and Q6 which constitute a second differential amplifier, transistors Q7 and Q8 which respectively supply constant currents to the first and second differential amplifiers, and a transistor Q9 which supplies a constant current to the transistors Q7 and Q8.

The emitters of the transistors Q7 and Q8 are commonly connected to the collector of the transistor Q9 respectively through resistors R7 and R8, respectively. The emitter of the transistor Q9 is grounded through a resistor R9. The collectors of the transistors Q3 and Q5 are connected to each other and their common node is connected to a voltage supply line Vcc. The collectors of the transistors Q4 and Q6 are connected to each other, and a tank circuit as a load which comprises an inductor L1, a resistor R6 and a capacitor C3 is connected between the common node of the collectors of the transistors Q4 and Q6 and the voltage supply line Vcc. A plurality of bias voltage sources V1, V2, V3 and V4 are arranged between the voltage supply line Vcc and ground. A voltage from the bias voltage source V1 is applied to the base of the transistor Q9 and to the bases of the transistors Q7 and Q8 through resistors R10 and R11, respectively. A voltage from the bias voltage source V2 is applied to the bases of the transistors Q3 and Q6 through a resistor 12. A voltage from the bias voltage source V3 is supplied to the bases of the transistors Q4 and Q5 through a resistor R13. The bases of the transistors Q3 and Q6 are commonly grounded through a capacitor C4.

The 4.43-MHz CW signal from the oscillator 59 is supplied to the bases of the transistors Q4 and Q5 through a capacitor C5 and to the base of the transistor Q7 through a capacitor C6. The 8.86-MHz doubled CW signal is produced from the collectors of the transistors Q4 and Q6. It is noted that the phase of the 8.86-MHz CW signal can be properly adjusted by adopting a variable inductor as the inductor L1. The 8.86-MHz CW signal is supplied to the contact Z1 of the line changeover switch 70 through a capacitor C7, a transistor Q10 and a capacitor C8. The base of the transistor Q10 is connected to a bias voltage source V5 through a resistor R14, the collector thereof is connected to the voltage supply line Vcc, and the emitter thereof is grounded through a resistor R15. A capacitor C9 and a resistor R16 which are connected to the contact Z2 of the line changeover switch 70 constitute a bias voltage source 71.

The modulator 68 comprises a double balanced modulator. This modulator comprises transistors Q11 and Q12 which constitute a first differential amplifier, transistors Q13 and Q14 which constitute a second differential amplifier, transistors Q15 and Q16 for supplying constant currents to the first and second differential amplifiers, and a transistor Q17 for supplying a constant current to the transistors Q15 and Q16.

The emitters of the transistors Q15 and Q16 are commonly connected to the collector of the transistor Q17 through resistors R17 and R18, respectively. The emitter of the transistor Q17 is grounded through a resistor R19. The collectors of the transistors Q11 and Q13 are connected to each other, and a common node thereof is connected to the voltage supply line Vcc. The collectors of the transistors Q12 and Q14 are connected to each other, and a band-pass filter of an inductor L2, a resistor R20 and a capacitor C10 is connected as a load between the collectors of the transistors Q12 and Q14 and the voltage supply line Vcc. A plurality of bias voltage sources V6, V7 and V8 are arranged between the voltage supply line Vcc and ground. A voltage from the bias voltage source V6 is supplied to the base of the transistor Q17 and to the bases of the transistors Q15 and Q16 through resistors R21 and R22, respectively. A voltage from the bias voltage source V7 is supplied to the bases of the transistors Q11 and Q14 through a resistor R23 and to the bases of the transistors Q12 and Q13 through a resistor R24.

The chrominance signal (FIG. 5(a)) as the output from the switch 66 is supplied to the base of the transistor Q15 through a capacitor C11. The output (FIG. 5(f)) from the line changeover switch 70 is supplied to the bases of the transistors Q11 and Q14. Therefore, the signal which includes the chrominance signal components given by equations (5) and (6) is produced alternately for each 1H from the collectors of the transistors Q12 and Q14. This signal is then supplied to the C-Y mixer 75 through a capacitor C12, a transistor Q18, and a capacitor C13. The base of the transistor Q18 is connected to a bias voltage source V9 through a resistor R25, the collector thereof is connected to the voltage supply line Vcc, and the emitter thereof is grounded through a resistor R26.

The capacitor C10, the resistor R20 and the inductor L2 which are connected to the collectors of the transistors Q12 and Q14 constitute the 4.43-MHz band-pass filter 74.

Figure 7:
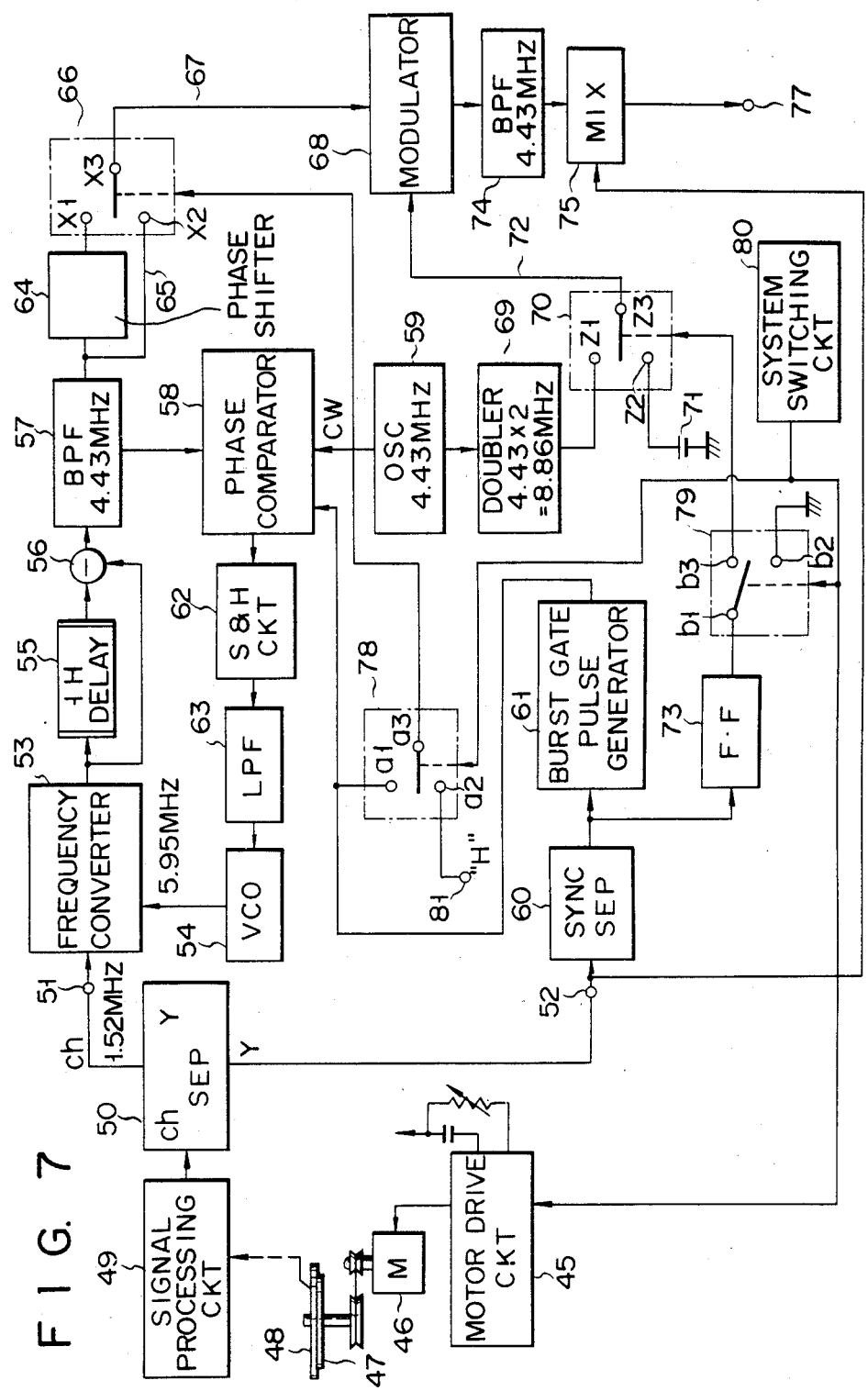
FIG. 7 is a block diagram of a color TV signal conversion device according to another embodiment of the present invention.

FIG. 7 shows a color TV signal conversion device according to another embodiment of the present invention. In the first embodiment, a signal recorded by the NTSC system on the video disc is converted to PAL signal components which are then reproduced. However, a case may occur wherein a signal recorded by the PAL system on the video disc needs to be reproduced. In this case, the conversion of the signal to the PAL signal is not required. More specifically, the signal need not be switched by the switch 66 after the burst signal thereof is phase-shifted by 45° and delayed by the 45° phase shifter 64. The 4.43-MHz chrominance signal need not be multiplied by the modulator 68 with the CW signal. In particular, the switch 66 and the line changeover switch 70 must be stopped by a proper means.

The device shown in FIG. 7 includes such a means. A first changeover switch 78 is arranged between a switch 66 and a burst gate pulse generator 61. A second changeover switch 79 is arranged between a line changeover switch 70 and a ½ fH oscillator 73. The first and second changeover switches 78 and 79 are controlled by a system changeover circuit 80.

The first changeover switch 78 has a first contact a1 connected to the burst gate pulse generator 61, a second contact a2 connected to a DC voltage supplying terminal 81 at which a DC signal of logic level "1" appears, and a third contact a3 connected to the line for controlling the switch 66. Similarly, the second changeover switch 79 has a first contact b1 connected to the oscillator 73, a second contact b2 which is grounded, and a third contact b3 connected to the line for controlling the line changeover switch 70. The system changeover circuit 80 controls the rotational frequency of the turntable and produces a control signal to switch the first and second changeover switches 78 and 79.

Figure 8:
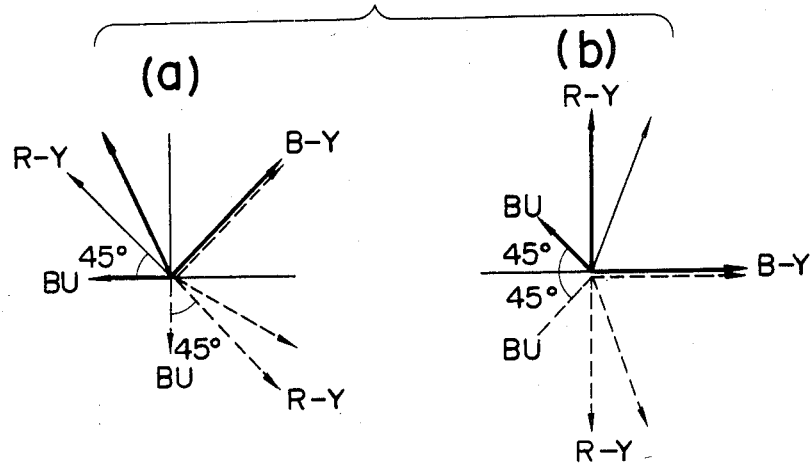
FIGS. 8(a) and 8(b) are diagrams showing vectors which help to explain the mode of operation of the device shown in FIG. 7.

In order to reproduce the signal recorded by the NTSC system, the first and third contacts a1 and a3 of the first changeover switch 78 are connected to each other, and the first and third contacts b1 and b3 of the second changeover switch 79 are connected to each other. Furthermore, the rotational frequency of the turntable (or disc) is multiplied by 0.9931. Therefore, the arrangement of the device shown in FIG. 7 is substantially the same as that of the device shown in FIG. 3. However, in order to reproduce a signal recorded by the PAL system, the second and third contacts a2 and a3 of the first changeover switch 78 are connected to each other. Since the DC voltage of logic level "1" is applied to the second contact a2 of the first changeover switch 78, the contacts X1 and X3 of the switch 66 are always connected to each other. In this case, the vectors of the signal supplied to the 45° phase shifter 64 is shown in FIG. 8(a). Since the phase of the burst signal has a constant relationship with that of the CW signal from the 4.43-MHz oscillator 59 by means of the APC loop, the output from a band-pass filter 57 is kept such that the R-Y and B-Y axes advance by 45° with respect to the CW signal, as shown in FIG. 8(a). Therefore, the chrominance signal which includes the burst signal is delayed by 45° by the connection between the contacts X1 and X3 of the switch 66, as shown in FIG. 8(b). The solid line in FIGS. 8(a) and 8(b) indicates vectors of the signal components on a given line, whereas the dotted line indicates those on the next line. The 4.43-MHz CW signal is the reference signal in the vector diagram in FIG. 8(a) wherein the R-T and B-Y components are delayed by the 45° phase shifter 64. However, if it is desired that the output from the band-pass filter 57 be as shown in FIGS. 4(a) and 4(b), the contacts X2 and X3 of the switch 66 may be constantly connected.

In this case, the first and second contacts b1 and b2 of the second changeover switch 79 are connected to each other, and a control signal is not supplied to the line changeover switch 70. Since the contacts Z2 and Z3 of the line changeover switch 70 are connected to each other, the 8.86-MHz CW signal is not supplied to the modulator 68.

In this manner, even if the signal is recorded by the PAL or NTSC system on the video disc, the recorded signal can be readily reproduced.

Figure 9:
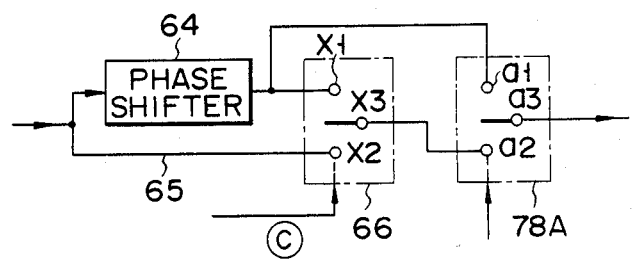
FIGS. 9 and 10 are block diagrams showing other embodiments of part of the device shown in FIG. 7, respectively.
Figure 10:
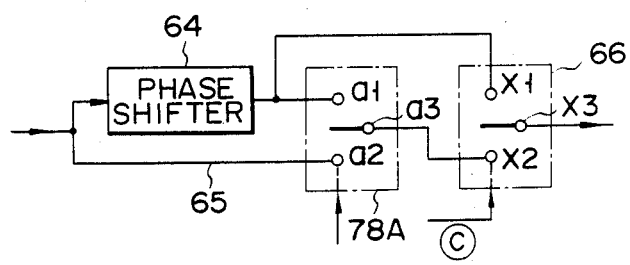

The first changeover switch 78 and the switch 66 are not limited to the arrangements shown in FIG. 7. For example, arrangements shown in FIGS. 9 and 10 may be adopted. Referring to FIG. 9, when the NTSC video disc is played back, the switch 66 is switched for every 1H, and contacts a2 and a3 of a line changeover switch 78A are connected to each other. However, when the PAL video disc is played back, the contact a1 and a contact a3 of the switch 78A are connected irrespective of the operation of the switch 66. Referring to FIG. 10, when the NTSC video disc is played back, the contacts a2 and a3 of the switch 78A are connected and the switch 66 is switched for every 1H.

However, when the PAL video disc is played back, the contacts a1 and a3 of the switch 78A are connected to each other, and the switch 66 is switched for every 1H. Even if the switch 66 is switched for every 1H, it is constantly connected to the 45° phase shifter 64.

According to another embodiment of the present invention, the doubler 69 shown in FIGS. 3 and 7 may be replaced by an 8.86-MHz oscillator, and the 4.43-MHz oscillator 59 may be replaced by a ½-frequency divider.

Various changes and modifications may be made within the spirit and scope of the present invention without departing from the spirit and scope of the appended claims.

When the color TV signal conversion circuit of the present invention is employed in a video disc player, an NTSC recorded signal can be readily reproduced by a PAL receiver.

Unlike a conventional system wherein the NTSC color TV signal is completely demodulated and this demodulated signal is then converted to PAL signal components, only a simple circuit is required.

Either a PAL recorded video disc or an NTSC recorded video disc can be readily played back in accordance with control of the system changeover circuit. The signal conversion function is stopped or started as needed.

What we claim is:

1. Color television converting apparatus comprising:

first signal generating means for generating a color television signal including at least a luminance signal having a line synchronization signal and a first carrier chrominance signal whose frequency has been converted into a lower one than a standard carrier frequency and on which two color signal components (B-Y) and (R-Y) are quadrature-modulated;

chrominance/luminance signal separator means, connected to said first signal generating means, for receiving said color television signal and separating it into said luminance signal and said first carrier chrominance signal;

luminance signal processing means for separating said line synchronization signal from said luminance signal and producing from said line synchronization signal a burst gate pulse signal and a switching control signal whose frequency is half the frequency of said line synchronization signal;

controllable oscillator means for providing a predetermined local frequency signal;

frequency converting means for converting said first carrier chrominance signal into a second carrier chrominance signal having said standard carrier frequency by mixing said predetermined local frequency signal with said first carrier chrominance signal;

burst signal processing means including 45 degrees phase shift means having an input, and first switching means having a first signal terminal connected via said phase shift means to said frequency converting means, and a second signal terminal connected between said frequency converting means and said phase shift means input, said burst signal processing means being controlled by said burst gate signal in such a manner that during a color burst period, only a color burst signal contained in said second carrier chrominance signal is phase-shifted by 45 degrees by said phase shift means so as to provide a third carrier chrominance signal in which a color burst signal is delayed with respect to an axis of said signal component (B-Y);

second signal generating means for producing a carrier signal whose frequency is twice as high as said standard carrier frequency;

modulator means for modulating said third carrier chrominance signal with said carrier signal;

second switching means response to said switching control signal for selectively supplying said second carrier signal to said modulator means for every other line.

2. Apparatus according to claim 1, wherein said modulator means includes a doubly balanced modulator.

3. Apparatus according to claim 1, wherein said second switching means has first and second receiving terminal, said first receiving terminal being connected to said second carrier source and said second receiving terminal being connected to a DC bias source, for determining a gain of said modulator means.

4. Apparatus according to claim 3 further including first band-pass filter means, coupled between said frequency converting means and said first signal processing means, for filtering said second carrier chrominance signal.

5. Apparatus according to claim 4, wherein said controllable oscillator means includes:

phase comparator means for detecting a phase of an output from said first band-pass filter means and a phase of an output from said second signal generating means during a burst signal period and for producing an output corresponding to a phase difference between said outputs at an output terminal thereof, said phase comparator having one input terminal which receives the output from said first band-pass filter means and a second input terminal which receives the output from said second signal generating means;

sample and hold means, connected to said output terminal of said phase comparator means, for holding the output from said phase comparator means for one horizontal period;

low-pass filter means for smoothing an output from said sample and hold means; and a voltage controlled oscillator, an oscillation frequency of which is controlled by a DC output voltage from said low-pass filter means.

6. Apparatus according to claim 1, wherein said second signal generating means includes a reference oscillator and a doubler for doubling a frequency of an oscillation output from said reference oscillator.

7. Apparatus according to claim 1, further including first band-pass filter means, coupled between said frequency converting means and said burst signal processing means, for filtering said second carrier chrominance signal, and wherein said second signal generating means includes:

a reference oscillator for providing an oscillation output having a predetermined frequency;

a phase comparator for detecting a phase of an output from said first band-pass filter means and a phase of an output from said reference oscillator during a burst signal period and for producing an output corresponding to a phase difference between said outputs at an output terminal thereof, said phase comparator having one input terminal which receives the output from said reference oscillator and a second input terminal which receives the output from said first bandpass filter means;

a sample and hold circuit, connected to said output terminal of said phase comparator, for holding the output from said phase comparator for one horizontal period;

a low-pass filter for smoothing an output from said sample and hold circuit;

a voltage controlled oscillator, an oscillation frequency of which is controlled by a DC voltage of an output from said low-pass filter; and a doubler for receiving the oscillation output from said reference oscillator and for doubling a frequency of said oscillation output to produce said carrier signal.

8. Apparatus according to claim 1, wherein said second switching means includes:

a first input terminal which receives said carrier signal from said second signal generating means;

a second input terminal grounded through a parallel circuit of a capacitor and a variable resistor; and an output terminal connected to said modulator means and to a bias voltage source of said modulator means.

9. Apparatus according to claim 1 wherein said luminance signal processing means includes:
   sync separator means for separating said synchronization signal from said luminance signal;
   burst gate pulse generator means for delaying and shaping said synchronization signal from said sync separator means and for generating a burst gate pulse;
   third switching means for selectively producing one of said burst gate pulse and a signal of a predetermined level at an output terminal thereof, said third switching means having a first input terminal which receives said burst gate pulse from said burst gate pulse generator means and a second input terminal which receives said signal of the predetermined level, and said output terminal of said third switching means being connected to said first switching means;
   flip-flop means for ½ frequency-dividing said synchronization signal from said sync separator means and for producing a frequency-divided signal;
   fourth switching means for selectively supplying said frequency-divided signal from said flip-flop means to said second switching means, said fourth switching means having an input terminal which receives said frequency-divided signal from said flip-flop means and an output terminal which is connected to said second switching means; and
   system control circuit means for turning on said fourth switching means when said first input terminal of said third switching means is connected to said output terminal thereof, and for turning off said fourth switching means when said second input terminal of said third switching means is connected to said output terminal thereof.

* * * * *